United States Patent
Gannon

(10) Patent No.: US 6,517,877 B2
(45) Date of Patent: Feb. 11, 2003

(54) ANIMAL FOOD PRODUCT

(76) Inventor: Martin Francis Gannon, Stylebawn House, Rocky Valley Drive, Kilmacanogue County Wicklow (IE)

( * ) Notice: Subject to any disclaimer, the term of this patent is extended or adjusted under 35 U.S.C. 154(b) by 0 days.

(21) Appl. No.: 09/750,343

(22) Filed: Dec. 29, 2000

(65) Prior Publication Data

US 2002/0155195 A1 Oct. 24, 2002

(51) Int. Cl.$^7$ .................................................. A23K 1/00
(52) U.S. Cl. ..................... 426/94; 426/74; 426/282; 426/283; 426/450; 426/516; 426/623; 426/635; 426/805
(58) Field of Search ........................ 426/94, 282, 283, 426/450, 623, 635, 805, 74, 516

(56) References Cited

U.S. PATENT DOCUMENTS

| | | | | |
|---|---|---|---|---|
| 3,916,029 A | * | 10/1975 | Hildebolt | 426/94 |
| 3,922,353 A | * | 11/1975 | Bernotavicz | 426/94 |
| 4,162,333 A | * | 7/1979 | Nelson et al. | 426/283 |
| 4,260,635 A | * | 4/1981 | Fisher | 426/3 |
| 4,273,788 A | * | 6/1981 | Bone et al. | 426/104 |
| 4,569,848 A | * | 2/1986 | Giogetti et al. | 426/94 |
| 4,610,884 A | * | 9/1986 | Lewis, III et al. | 426/103 |
| 4,762,723 A | | 8/1988 | Strong | 426/283 |
| 4,777,058 A | * | 10/1988 | Chandler et al. | 426/448 |
| 4,847,098 A | | 7/1989 | Langler | 426/102 |
| 4,853,236 A | * | 8/1989 | Langler | 426/102 |
| 4,900,572 A | * | 2/1990 | Repholz et al. | 426/102 |
| 5,643,623 A | | 7/1997 | Schmitz et al. | 426/73 |
| 5,695,797 A | * | 12/1997 | Geromini et al. | 426/62 |
| 6,117,477 A | * | 9/2000 | Pauluch | 426/94 |
| 6,254,910 B1 | * | 7/2001 | Paluch | 426/282 |

FOREIGN PATENT DOCUMENTS

| | | | |
|---|---|---|---|
| EP | 0 088 574 | * | 9/1983 |
| EP | 0 862 863 | * | 9/1998 |
| WO | WO 96/39869 | * | 12/1996 |

* cited by examiner

*Primary Examiner*—Nina Bhat
(74) *Attorney, Agent, or Firm*—Birch, Stewart, Kolasch & Birch, LLP

(57) ABSTRACT

A co-extruded dual component animal food product has an outer component containing at least 60% cereal and an inner cream textured component which has water soluble components in an aqueous phase that forms a stable emulsion with a lipid free hydrocarbon phase. The hydrocarbon phase contains soluble additives. Careful stepwise addition of additives to the appropriate phases and then of the phase together ensures a stable inner component which does not leach through the outer component.

92 Claims, 1 Drawing Sheet

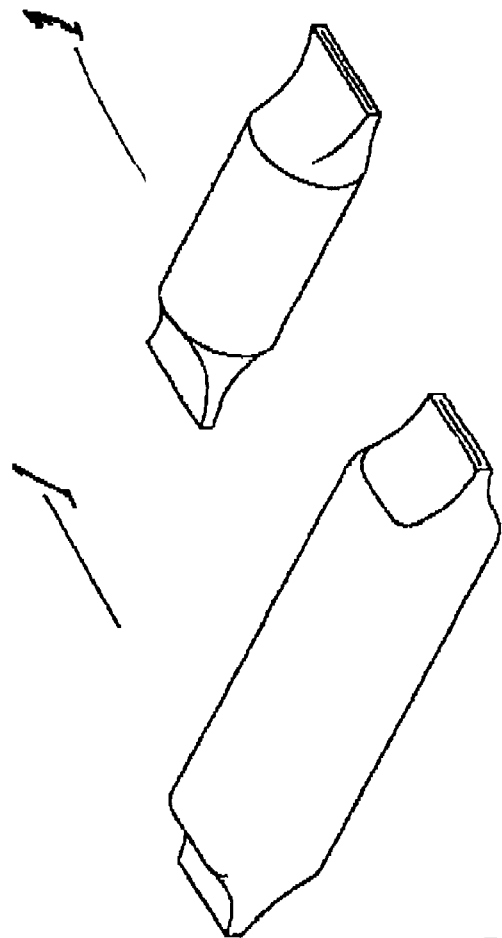
Fig. 1
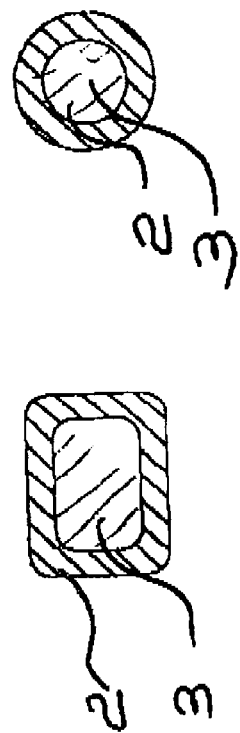
Fig. 3
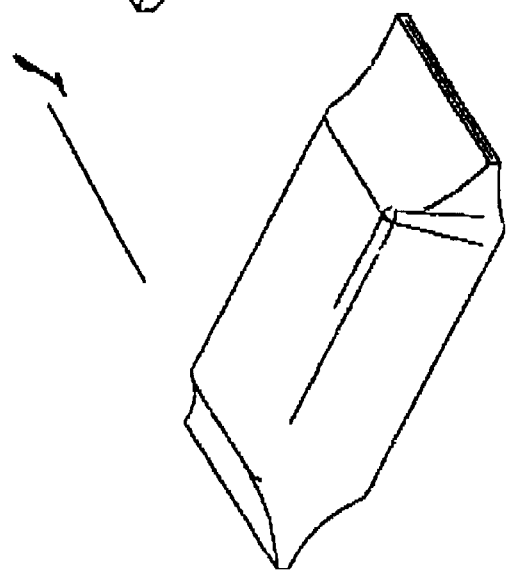
Fig. 5
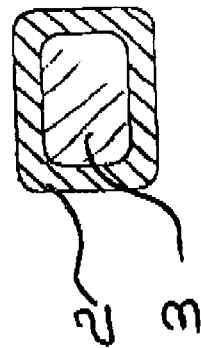
Fig. 2
Fig. 4
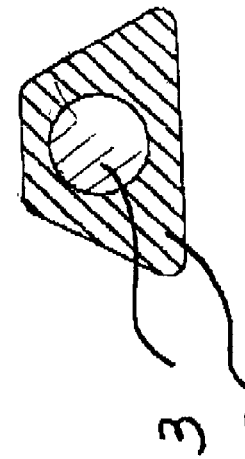
Fig. 6

ANIMAL FOOD PRODUCT

BACKGROUND OF THE INVENTION

Introduction

1. Field of the Invention

This invention relates to an animal food product and a method for making such an animal food product and in particular, to a co-extruded dual component animal food product of the type comprising an outer component, including carbohydrate, lipid and protein and an inner cream texture component encapsulated within the outer component by the co-extrusion process.

2. Description of Prior Art

It is known to provide such co-extruded dual component animal food products in which the inner component comprises a cream textured matrix which is formed without an aqueous phase and has a total moisture content of less than about 15% by weight. The major feature of this inner component is that firstly it contains a considerable amount of lipid, namely, fat, and secondly there is no water phase. A typical product is that described in U.S. Pat. No. 6,117,477 (Paluch). This patent specification clearly teaches away from the use of an aqueous phase in the inner component. It has long been appreciated that an aqueous phase would be desirable for the number of water soluble additives that could then be used. It has also been appreciated that, for example, as suggested in U.S. Pat. No. 4,847,098 (Langler) to do this, you would require extra stabilisers and emulsifiers. A further problem with the use of lipids in the inner components is that anti-oxidants are usually required. Thus, conventional wisdom taught away from the use of low viscosity and aqueous phase inner components in dual textured co-extruded food products. Heretofore, people have not been successful in providing such an aqueous based inner component. Essentially, the problem is the incorporation of water soluble in the inner component in sufficient quantities so as to provide a suitable product. Heretofore, conventional wisdom has suggested that high moisture content means a product that is unstable in respect of microbial growth and effectively separation stability. Further, as explained above, water tends to leak from the inner component to the outer component or shell-like covering causing it to become soggy.

Generally speaking, such animal food products should contain a number of ingredients which are functional, that is to say, which help with the stabilisation, taste and general appearance and organoleptic properties of the product and active ingredients which can be loosely defined as minerals and vitamins or, for example, various healthcare products such as laxatives and coat improvers.

Generally speaking, the extrusion process is relatively simple and comprises a twin screw extrusion system which allows the inner component to be pumped into the centre of the outer component which is effectively a rope and then the composite filled rope is divided by a crimper into desired sizes. A typical example of such an extruder is that described in U.S. Pat. No. 4,900,572 (Repholz et al).

Another typical example of such a food product, although this one is for human consumption, is described in U.S. Pat. No. 5,643,623 (Schmitz et al) which describes an inner component containing an anti-oxidant.

SUMMARY OF THE INVENTION

In accordance with the invention, there is provided a co-extruded dual component animal food product of the type hereinbefore described in which the cereal comprises at least 60% by weight of the outer component, the outer component has a total moisture content less than 5% by weight of itself, the inner cream textured component comprises a stable continuous emulsion of water soluble additives in an aqueous phase, and hydrocarbon soluble additives in a lipid-free hydrocarbon phase and in which the inner cream textured component has a moisture content of between 8.0% and 16% by weight of itself.

Ideally, the aqueous phase comprises a high solids content sugar syrup containing at least 60% by weight sugar with the sugar syrup comprising sugar and water in the ratio of between 60:40 and 90:10 and ideally of the order of 80:20. The sugar syrup content of the inner component is generally between 25 to 55% by weight of the outer component and preferably of the order of 40% by weight of the inner component.

Ideally, the hydrocarbon phase is liquid paraffin or petroleum jelly.

Ideally, the hydrocarbon phase is between 25 and 55% by weight of the inner component and is often of the order of 40% of the total weight of the inner component.

The water soluble additives comprise one or more of:
calcium carbonate,
dipotassium phosphate,
manganous sulphate monohydrate,
zinc chelate,
Inositol,
folic acid,
taurine,
pantothenic acid,
potassium sorbate.
tricalcium phosphate,
ferrous sulphate heptahydrate,
copper chelate,
Niacin,
herbal extracts,
plant-based extracts,
caramel, and
sodium benzoate.

Similarly, the hydrocarbon soluble additives comprise one or more of:
vitamin A palmitate,
vitamin oil D,
di-α-tocopheryl acetate,
flavourings,
glycerol,
acacia gum.

The outer component, as well as cereal, additionally comprises one or more of the following:
mineral supplements
herbal extracts, and
plant-based extracts.

The inner cream-textured component may include particulate additives insoluble in water and hydrocarbons, which particulate additives may comprise an inner core encapsulated in a water and hydrocarbon insoluble outer shell.

Further, the invention provides a method of producing a dual textured animal food product by co-extrusion comprising:

preparing a dry mixture of carbohydrate protein and lipid including at least 60% by weight of dry cereal;

ensuring the dry mixture has a moisture content of less than 5.0% by weight;

preparing an aqueous phase solution of water and water soluble additives;

preparing a hydrocarbon phase of a lipid-free liquid hydrocarbon and hydrocarbon soluble additives;

combining the aqueous and hydrocarbon phases in proportions such as to achieve a total moisture content for the emulsion of between 8% and 16% by weight;

homogenising the aqueous and hydrocarbon phases to form a continuous stable emulsion, the homogenising comprising the steps of adding the hydrocarbon phase to the aqueous phase in discrete batches mixing them to form a continuous stable emulsion, the amount of each batch of the hydrocarbon phase not exceeding 10% by weight of the liquid to which it is added;

co-extruding the dry mixture as an outer component with the continuous stable emulsion as an inner cream-textured component; and crimping and cutting the extrudate into discrete pillow shapes.

Ideally, in this method, the additives are dissolved in the appropriate phase in discrete batches.

In the method according to the invention, when the weight of additives to be added to a phase exceeds 10% by weight of the phase, the additive is dissolved in the phase in batches not exceeding 10% by weight of the phase to which it is being added.

Generally speaking, the method comprises:

mixing sugar and water in the ratio of at least 60:40 by weight to form a base aqueous phase and then adding additional water soluble additives to form the aqueous phase.

Ideally, after the continuous stable emulsion is formed, further additives both water and hydrocarbon soluble dissolved in glycerol are added and homogenised with the stable emulsion. Ideally, the aqueous phase comprises a high solids content sugar syrup containing at least 60% by weight sugar and the sugar syrup may comprise sugar and water in the ratio of between 60:40 and 90:10. The ratio of sugar to water is often of the order of 80:20 and generally the sugar syrup content of the inner component is between 25 to 55% by weight of the inner component and is preferably of the order of 40% by weight.

In the method, the hydrocarbon phase is liquid paraffin and comprises between 25 and 55% by weight of the inner component and may often be of the order of 40% of the total weight of the inner component.

Ideally, the water soluble additives comprise on or more of:

calcium carbonate,
dipotassium phosphate,
manganous sulphate monohydrate,
zinc chelate,
tricalcium phosphate,
ferrous sulphate heptahydrate,
copper chelate,
niacin,
inositol,
folic acid,
taurine,
pantothenic acid,
potassium sorbate,
herbal extracts,
plant-based extracts,
caramel,
sodium benzoate.

Further, the hydrocarbon soluble additives comprise one or more:

vitamin A palmitate,
vitamin oil D,
di-αtocopheryl actetate,
flavourings,
glycerol, and
acacia gum.

The outer component additionally comprises one or more of the following:

mineral supplements,
herbal extracts,
plant base extracts, and
lecithin.

In another method according to the invention, the inner cream textured component has added thereto particulate additives insoluble in water and hydrocarbons.

When particulate additives are added, they comprise an inner core encapsulated in a water and hydrocarbon insoluble outer shell.

BRIEF DESCRIPTION OF THE DRAWINGS

The invention will be more clearly understood from the following description of some embodiments thereof, by way of example only, with reference to the accompanying examples and drawings in which:

FIG. 1 is a perspective view of a food product according to the invention,

FIG. 2 is a typical sectional view through the food product,

FIG. 3 is a view similar to FIG. 1 of another food product,

FIG. 4 is a sectional view through the food product of FIG. 3,

FIG. 5 is a perspective view of a still further food product,

FIG. 6 is a typical sectional view through the food product of FIG. 5.

DETAILED DESCRIPTION OF THE PREFERRED EMBODIMENTS

Referring to the drawings, there is provided a co-extruded food product, indicated generally by the reference numeral 1 having an outer component 2 and an inner cream textured component encapsulated within the outer component by a co-extrusion process. The outer component 2 includes carbohydrate, lipid and protein. Typically, in the invention, the cereal comprises at least 60% by weight of the outer component, the outer component generally has a total moisture content less than 5% by weight of itself. The inner cream textured component 3 comprises a stable continuous emulsion and water soluble additives in an aqueous phase and carbon soluble additives in a lipid-free hydrocarbon phase. Generally, the inner cream textured components has a moisture content of between 8 and 16% by weight of itself. Thus, the inner cream textured component is able to dissolve or solubilise a considerable amount of water soluble additive. It will be appreciated that these general production processes are well known and do not require any particular description. The three examples of the pillow-like products have been shown in the drawings to demonstrate that various shapes may be produced and that the product can be produced in any convenient size suitable for particular pet-type applications. Thus, for example, depending on the size of the animal, the size of the pillow-like product will change.

The following examples are typical of some of the formulations and products that may be provided according to the invention. It will be appreciated that many other formulations can be provided.

The various examples listed below give some formulations as suggested already. However, the important feature of the present invention is the manner in which the inner component is formed. It is not just simply a matter of taking an aqueous phase and homogenising it with a mineral oil or hydrocarbon oil so as to product an homogenous natural emulsion. Unfortunately, this will not succeed. It has been found that the inner component has to be very carefully prepared. Firstly, the aqueous phase is prepared by mixing sugar and water where it is a high solids content sugar syrup containing at least 60% by weight of water. Generally, it is mixed in the ratio of 60:40 and as high as 90:10 sugar syrup ratio, although in general, the preferred sugar water ratio is of the order of 80:20. Generally speaking, the sugar syrup content of the inner component is of the order of 25 to 55% by weight of the outer component and usually of the order of 40% by weight. When the high solids content sugar syrup has been prepared, various water soluble additives are then added to the sugar syrup mixture. It has, however, been found that if too many additives are added too quickly, that considerable difficulty can be encountered in providing a suitable aqueous phase. Thus, in accordance with the invention, never more than 10% by weight of additive is dissolved in the aqueous phase until all the additives have been dissolved. Thus, the mixing of the water soluble additives and the sugar syrup take place in discrete batches if the total amount of additives, as would normally be the case, exceeds 10% by weight of the sugar syrup mixture. The same procedure is carried out, most importantly, when hydrocarbon phase is added to the aqueous phase and the two are mixed to form a continuous emulsion. This stepwise addition of the ingredients is what allows the emulsion to remain stable in use. Therefore, the water soluble ingredients are added to the aqueous phase and when fully mixed and homogenised, the hydrocarbon phase is then added. Generally, the hydrocarbon phase may have its soluble additives added to it prior to addition to the aqueous phase or alternatively hydrocarbon soluble additives can be added, as is often the case, to the homogenised aqueous and hydrocarbon phases.

EXAMPLE 1 -Multivitamin Treat for Cats

EXAMPLE 1

| Multivitamin Treat for Cats | |
|---|---|
| Inner Component | W/w % |
| Malt Syrup | 38.48 |
| Petrolatum | 45.38 |
| Glycerol | 7.0 |
| Acacia Gum | 1.5 |
| Flavouring | 4.0 |
| Potassium Sorbate | 0.25 |
| Vitamin A (1 m IU/g) | 0.05 |
| Vitamin D (1 m IU/g) | 0.005 |
| Vitamin E (1,000 IU/g) | 0.5 |

EXAMPLE 1-continued

| Multivitamin Treat for Cats | |
|---|---|
| Thiamin (B1) | 0.05 |
| Riboflavin (B2) | 0.04 |
| Vitamin B12 | $2 \times 10^{-4}$ |
| Niacin | 0.6 |
| Choline | 0.5 |
| Inositol | 0.4 |
| Folic Acid | $8 \times 10^{-3}$ |
| Taurine | 1.2 |
| Pantothenic Acid | 0.05 |
| TOTAL | 100% |
| Outer Component | w/w % |
| Wheat Flour | 25 |
| Rice Flour | 25 |
| Sunflower Oil | 10 |
| Wheat Bran | 25 |
| Lecithin | 10 |
| Flavouring | 3 |
| Caramel | 2 |
| | 100% |

EXAMPLE 2 -Lawn Care Treat for Dogs

EXAMPLE 2

| Lawn Care Treat for Dogs | |
|---|---|
| Inner Component | W/w % |
| Malt Syrup | 39 |
| Petrolatum | 42.9 |
| Glycerol | 7.0 |
| Acacia Gum | 1.5 |
| Flavouring | 2.5 |
| Yucca Schidigera Extract | 7 |
| Caramel | 0.1 |
| | 100% |
| Outer Component | w/w % |
| Wheat Flour | 25 |
| Rice Flour | 20 |
| Sunflower Oil | 10 |
| Wheat Bran | 25 |
| Lecithin | 10 |
| Flavouring | 5 |
| Yucca Schidigera | 5 |
| | 100% |

EXAMPLE 3 -Deodorizing Treat for Cats

EXAMPLE 3

| Deodorizing Treat for Cats | |
|---|---|
| Inner Component | W/w % |
| Malt Syrup | 36.7 |
| Petrolatum | 43.6 |
| Glycerol | 7.1 |
| Acacia Gum | 1.5 |
| Flavouring | 4 |
| Yucca Schidigera | 7 |
| Caramel | 0.1 |
| | 100% |

EXAMPLE 3-continued

Deodorizing Treat for Cats

| Outer Component | w/w % |
|---|---|
| Wheat Flour | 25 |
| Rice Flour | 20 |
| Sunflower Oil | 10 |
| Wheat Bran | 25 |
| Lecithin | 10 |
| Flavouring | 5 |
| Yucca Schidigera | 5 |
| | 100% |

EXAMPLE 4 - Bulk Cream for Treat

EXAMPLE 4

Bulk Cream for Treat

| Inner Component | W/w % |
|---|---|
| Malt Syrup | 44.949 |
| Sodium Benzoate | 0.25 |
| Caramel | 0.2 |
| Liquid Paraffin | 42 |
| Flavoring | 4 |
| Glycerol | 7.1 |
| Acacia Gum | 1.5 |
| Vitamin E | 0.001 |
| | 100% |

| Outer Component | w/w % |
|---|---|
| Wheat Flour | 30 |
| Rice Flour | 30 |
| Sunflower Oil | 10 |
| Milk Solids | 5 |
| Wheat Bran | 10 |
| Lecithin | 5 |
| Flavouring | 10 |
| | 100% |

EXAMPLE 5 - Multivitamin Treats for Dogs

EXAMPLE 5

Multivitamin Treats for Dogs

| Inner Component | W/w % |
|---|---|
| Malt Syrup | 38.385 |
| Petrolatum | 45.285 |
| Glycerol | 7.0 |
| Acacia Gum | 1.5 |
| Flavouring | 4.0 |
| Potassium Sorbate | 0.25 |
| Active Incredients | |
| Vitamin A (1 m IU/g) | 0.05 |
| Vitamin D (1 m IU/g) | 0.005 |
| Vitamin E (1,000 IU/g) | 0.5 |
| Thiamin (B1) | 0.01 |
| Riboflavin (B2) | 0.02 |
| Pyridoxine (B6) | 0.01 |
| Vitamin B12 | $2.2 \times 10^{-4}$ |
| Niacin | 0.1 |
| Choline | 0.7 |
| Calcium | 0.66 |
| Phosphorus | 0.52 |
| Potassium | 0.68 |
| Iron | 0.015 |

EXAMPLE 5-continued

Multivitamin Treats for Dogs

| | |
|---|---|
| Copper | 0.01 |
| Manganese | $6 \times 10^{-3}$ |
| Zinc | 0.3 |
| | 100% |

| Outer Component | w/w % |
|---|---|
| Wheat Flour | 30 |
| Rice Flour | 30 |
| Sunflower Oil | 10 |
| Wheat Bran | 25 |
| Lecithin | 10 |
| Flavouring | 3 |
| Caramel | 2 |
| | 100% |

It has been found that the moisture content can be as high, as is often desirable, as 16% but generally speaking, it tends to be somewhat lower. While sufficient tests have not yet been carried out, it would appear that the principal reason for the inner cream textured component not leaching out through the outer component is because the emulsion gives what is a relatively high viscosity liquid.

It has been found that the outer component should contain at least 60% by weight of cereal. This produces a very suitable outer coating for animal foods.

Tables 1, 2 and 3 list respectively certain water soluble additives, hydrocarbon soluble additives and components that may be added to the outer component.

TABLE 1

Water Soluble Additives

| | |
|---|---|
| calcium carbonate, | tricalcium phosphate, |
| dipotassium phosphate, | ferrous sulphate heptahydrate, |
| manganous sulphate monohydrate, | ipaglio copper chelate, |
| Ipaglio zinc chelate, | Niacin, |
| Inositol, | herbal extracts |
| folic acid, | plant-based extracts, |
| taurine, | caramel, and |
| pantothenic acid, | sodium benzoate. |
| potassium sorbate. | |

TABLE 2

Hydrocarbon Soluble Additives vitamin A palmitate,
vitamin oil D,
di- tocopheryl acetate,
flavourings,
glycerol,
acacia gum.

TABLE 3

Outer Component Additives mineral supplements
herbal extracts, and
plant-based extracts.

According to the present invention, the aqueous phase when dispersed in the mineral oil and homogenised forms a stable natural emulsion without the need for extra added stabilisers or emulsifiers such as has been the case with the prior art. Any suitable hydrocarbon can be used but particularly useful is paraffin or petrolatum, namely, petroleum jelly. It is also advantageous that there is no fat phase. It has been found that a particularly useful way of providing the hydrocarbon or additional additives is to dissolve them in glycerol.

It is also envisaged that the inner cream textured component could include particulate additives insoluble in water and hydrocarbons. These could, for example, be formed of pill-like members having a hard outer core and an inner soft core such as, for example, could be dissolved in the intestines of animals.

In the specification the terms "comprise, comprises, comprised and comprising" or any variation thereof and the terms "include, includes, included and including" or any variation thereof are considered to be totally interchangeable and they should all be afforded the widest possible interpretation.

The invention is not limited to the embodiments hereinbefore described but may be varied in both construction and detail within the scope of the claims.

What is claimed is:

1. A co-extruded dual component animal food product comprising:
   an outer component which comprises a carbohydrate lipid and protein at least 60% by weight of which is provided by dry cereal, the outer component having a moisture content of less than 5.0% by weight; and
   an inner cream textured component encapsulated within the outer component by the co-extrusion process which comprises a continuous stable emulsion of water soluble additives in an aqueous phase and hydrocarbon soluble additives in a lipid free hydrocarbon phase which inner cream textured component has a total moisture content between 8 and 16% by weight.

2. An animal food product as claimed in claim 1, wherein the aqueous phase comprises a high solids content sugar syrup containing at least 60% by weight sugar.

3. An animal food product as claimed in claim 1, wherein the aqueous phase comprises a high solids content sugar syrup with a sugar water ratio between 60:40 and 90:10.

4. An animal food product as claimed in claim 1, wherein the aqueous phase comprises a high solids content liquid sugar syrup with a sugar water ratio of the order of 80:20.

5. An animal food product as claimed in claim 1, wherein the aqueous phase comprises a high solids content sugar syrup containing at least 60% by weight sugar and in which the sugar syrup content of the inner component is between 25 to 55% by weight of the outer component.

6. An animal food product as claimed in claim 1, wherein the aqueous phase comprises a high solids content sugar syrup with a sugar water ratio between 60:40 and 90:10 and in which the sugar syrup content of the inner component is between 25 to 55% by weight of the outer component.

7. An animal food product as claimed in claim 1, wherein the aqueous phase comprises a high solids content liquid sugar syrup with a sugar water ratio of the order of 80:20 and in which the sugar syrup content of the inner component is between 25 to 55% by weight of the outer component.

8. An animal food product as claimed in claim 1, wherein the aqueous phase comprises a high solids content sugar syrup containing at least 60% by weight sugar and in which the sugar syrup content of the inner component is of the order of 40% by weight of the outer component.

9. An animal food product as claimed in claim 1, wherein the aqueous phase comprises a high solids content sugar syrup with a sugar water ratio between 60:40 and 90:10 and in which the sugar syrup content of the inner component is of the order of 40% by weight of the outer component.

10. An animal food product as claimed in claim 1, wherein the aqueous phase comprises a high solids content liquid sugar syrup with a sugar water ratio of the order of 80:20 and in which the sugar syrup content of the inner component is of the order of 40% by weight of the outer component.

11. An animal food product as claimed in claim 1, in which the hydrocarbon phase comprises liquid paraffin.

12. An animal food product as claimed in claim 1, wherein the aqueous phase comprises a high solids content sugar syrup containing at least 60% by weight sugar and in which the hydrocarbon phase comprises liquid paraffin.

13. An animal food product as claimed in claim 1, wherein the aqueous phase comprises a high solids content sugar syrup with a sugar water ratio between 60:40 and 90:10 and in which the hydrocarbon phase comprises liquid paraffin.

14. An animal food product as claimed in claim 1, wherein the aqueous phase comprises a high solids content liquid sugar syrup with a sugar water ratio of the order of 80:20 and in which the hydrocarbon phase comprises liquid paraffin.

15. An animal food product as claimed in claim 1, wherein the aqueous phase comprises a high solids content sugar syrup containing at least 60% by weight sugar, in which the sugar syrup content of the inner component is between 25 to 55% by weight of the outer component and in which the hydrocarbon phase comprises liquid paraffin.

16. An animal food product as claimed in claim 1, wherein the aqueous phase comprises a high solids content sugar syrup with a sugar water ratio between 60:40 and 90:10, in which the sugar syrup content of the inner component is between 25 to 55% by weight of the outer component and in which the hydrocarbon phase comprises liquid paraffin.

17. An animal food product as claimed in claim 1, wherein the aqueous phase comprises a high solids content liquid sugar syrup with a sugar water ratio of the order of 80:20, in which the sugar syrup content of the inner component is between 25 to 55% by weight of the outer component and in which the hydrocarbon phase comprises liquid paraffin.

18. An animal food product as claimed in claim 1, wherein the aqueous phase comprises a high solids content sugar syrup containing at least 60% by weight sugar, in which the sugar syrup content of the inner component is of the order of 40% by weight of the outer component and in which the hydrocarbon phase comprises liquid paraffin.

19. An animal food product as claimed in claim 1, wherein the aqueous phase comprises a high solids content sugar syrup with a sugar water ratio between 60:40 and 90:10, in which the sugar syrup content of the inner component is of the order of 40% by weight of the outer component and in which the hydrocarbon phase comprises liquid paraffin.

20. An animal food product as claimed in claim 1, wherein the hydrocarbon phase comprises liquid paraffin comprising between 25 and 55% by weight of the inner component.

21. An animal food product as claimed in claim 1, wherein the aqueous phase comprises a high solids content sugar syrup containing at least 60% by weight sugar and in which the hydrocarbon phase comprises liquid paraffin comprising between 25 and 55% by weight of the inner component.

22. An animal food product as claimed in claim 1, wherein the aqueous phase comprises a high solids content sugar syrup with a sugar water ratio between 60:40 and 90:10 and in which the hydrocarbon phase comprises liquid paraffin comprising between 25 and 55% by weight of the inner component.

23. An animal food product as claimed in claim 1, wherein the aqueous phase comprises a high solids content liquid sugar syrup with a sugar water ratio of the order of 80:20 and in which the hydrocarbon phase comprises liquid paraffin comprising between 25 and 55% by weight of the inner component.

24. An animal food product as claimed in claim 1, wherein the aqueous phase comprises a high solids content sugar syrup containing at least 60% by weight sugar, in which the sugar syrup content of the inner component is between 25 to 55% by weight of the inner component and the hydrocarbon phase comprises liquid paraffin comprising between 25 and 55% by weight of the inner component.

25. An animal food product as claimed in claim 1, wherein the aqueous phase comprises a high solids content sugar syrup with a sugar water ratio between 60:40 and 90:10, in which the sugar syrup content of the inner component is between 25 to 55% by weight of the inner component and the hydrocarbon phase comprises liquid paraffin comprising between 25 and 55% by weight of the inner component.

26. An animal food product as claimed in claim 1, wherein the aqueous phase comprises a high solids content liquid sugar syrup with a sugar water ratio of the order of 80:20, in which the sugar syrup content of the inner component is between 25 to 55% by weight of the inner component and the hydrocarbon phase comprises liquid paraffin comprising between 25 and 55% by weight of the inner component.

27. An animal food product as claimed in claim 1, wherein the aqueous phase comprises a high solids content sugar syrup containing at least 60% by weight sugar, in which the sugar syrup content of the inner component is of the order of 40% by weight of the inner component and the hydrocarbon phase comprises liquid paraffin comprising between 25 and 55% by weight of the inner component.

28. An animal food product as claimed in claim 1, wherein the aqueous phase comprises a high solids content sugar syrup with a sugar water ratio between 60:40 and 90:10, in which the sugar syrup content of the inner component is of the order of 40% by weight of the inner component and the hydrocarbon phase comprises liquid paraffin comprising between 25 and 55% by weight of the inner component.

29. An animal food product as claimed in claim 1, in which the hydrocarbon phase comprises liquid paraffin which is of the order of 40% of the total weight of the inner component.

30. An animal food product as claimed in claim 1, wherein the aqueous phase comprises a high solids content sugar syrup containing at least 60% by weight sugar and the hydrocarbon phase comprises liquid paraffin which is of the order of 40% of the total weight of the inner component.

31. An animal food product as claimed in claim 1, wherein the aqueous phase comprises a high solids content sugar syrup with a sugar water ratio between 60:40 and 90:10 and the hydrocarbon phase comprises liquid paraffin which is of the order of 40% of the total weight of the inner component.

32. An animal food product as claimed in claim 1, wherein the aqueous phase comprises a high solids content liquid sugar syrup with a sugar water ratio of the order of 80:20 and the hydrocarbon phase comprises liquid paraffin which is of the order of 40% of the total weight of the inner component.

33. An animal food product as claimed in claim 1, wherein the aqueous phase comprises a high solids content sugar syrup containing at least 60% by weight sugar, in which the sugar syrup content of the inner component is between 25 to 55% by weight of the inner component and the hydrocarbon phase comprises liquid paraffin which is of the order of 40% of the total weight of the inner component.

34. An animal food product as claimed in claim 1, wherein the aqueous phase comprises a high solids content sugar syrup with a sugar water ratio between 60:40 and 90:10, in which the sugar syrup content of the inner component is between 25 to 55% by weight of the inner component and the hydrocarbon phase comprises liquid paraffin which is of the order of 40% of the total weight of the inner component.

35. An animal food product as claimed in claim 1, wherein the aqueous phase comprises a high solids content liquid sugar syrup with a sugar water ratio of the order of 80:20, in which the sugar syrup content of the inner component is between 25 to 55% by weight of the inner component and the hydrocarbon phase comprises liquid paraffin which is of the order of 40% of the total weight of the inner component.

36. An animal food product as claimed in claim 1, wherein the aqueous phase comprises a high solids content sugar syrup containing at least 60% by weight sugar, in which the sugar syrup content of the inner component is of the order of 40% by weight of the inner component and the hydrocarbon phase comprises liquid paraffin which is of the order of 40% of the total weight of the inner component.

37. An animal food product as claimed in claim 1, wherein the aqueous phase comprises a high solids content sugar syrup with a sugar water ratio between 60:40 and 90:10, in which the sugar syrup content of the inner component is of the order of 40% by weight of the inner component and the hydrocarbon phase comprises liquid paraffin which is of the order of 40% of the total weight of the inner component.

38. An animal food product as claimed in claim 1 in which the water soluble additives comprise one or more of:
  calcium carbonate,
  dipotassium phosphate,
  manganous sulphate monohydrate,
  zinc chelate,
  Inositol,
  folic acid,
  taurine,
  pantothenic acid,
  potassium sorbate,
  tricalcium phosphate,
  ferrous sulphate heptahydrate,
  copper chelate,
  Niacin,
  herbal extracts,
  plant-based extracts,
  caramel, and
  sodium benzoate.

39. An animal food product as claimed in claim 1 in which the hydrocarbon soluble additives comprise one or more of:
  vitamin A palmitate,
  vitamin oil D,
  di-αtocopheryl acetate,
  flavourings,
  glycerol,
  acacia gum.

40. An animal food product as claimed in claim 1 in which the outer component additionally comprises one or more of the following:
  mineral supplements
  herbal extracts, and
  plant-based extracts.

41. An animal food product as claimed in claim 1, in which the water soluble additives comprise one or more of:

calcium carbonate,
dipotassium phosphate,
manganous sulphate monohydrate,
zinc chelate,
Inositol,
folic acid,
taurine,
pantothenic acid,
potassium sorbate,
tricalcium phosphate,
ferrous sulphate heptahydrate,
copper chelate,
Niacin,
herbal extracts,
plant-based extracts,
caramel, and
sodium benzoate,
and in which the hydrocarbon soluble additives comprise one or more of:
vitamin A palmitate,
vitamin oil D,
di-αtocopheryl acetate,
flavourings,
glycerol,
acacia gum.

42. An animal food product as claimed in claim 1 in which the water soluble additives comprise one or more of:
calcium carbonate,
dipotassium phosphate,
manganous sulphate monohydrate,
zinc chelate,
Inositol,
folic acid,
taurine,
pantothenic acid,
potassium sorbate,
tricalcium phosphate,
ferrous sulphate heptahydrate,
copper chelate,
Niacin,
herbal extracts,
plant-based extracts,
caramel, and
sodium benzoate,
and in which the outer component additionally comprises one or more of the following:
mineral supplements
herbal extracts, and
plant-based extracts.

43. An animal food product as claimed in claim 1 in which the hydrocarbon soluble additives comprise one or more of:
vitamin A palmitate,
vitamin oil D,
di-αtocopheryl acetate,
flavourings,
glycerol,
acacia gum,
and in which the outer component additionally comprises one or more of the following:
mineral supplements
herbal extracts, and
plant-based extracts.

44. An animal food product as claimed in claim 1 in which the water soluble additives comprise one or more of:
calcium carbonate,
dipotassium phosphate,
manganous sulphate monohydrate,
zinc chelate,
Inositol,
folic acid,
taurine,
pantothenic acid,
potassium sorbate,
tricalcium phosphate,
ferrous sulphate heptahydrate,
copper chelate,
Niacin,
herbal extracts,
plant-based extracts,
caramel, and
sodium benzoate,
in which the hydrocarbon soluble additives comprise one or more of:
vitamin A palmitate,
vitamin oil D,
di-αtocopheryl acetate,
flavourings,
glycerol,
acacia gum,
and in which the outer component additionally comprises one or more of the following:
mineral supplements
herbal extracts, and
plant-based extracts.

45. An animal food product as claimed in claim 1 in which the inner cream-textured component includes particulate additives insoluble in water and hydrocarbons.

46. An animal food product as claimed in claim 45 in which the particulate additives comprise an inner core encapsulated in a water and hydrocarbon insoluble outer shell.

47. A co-extruded dual component animal food product comprising:
an outer component which comprises a carbohydrate lipid and protein at least 60% by weight of which is provided by dry cereal, the outer component having a moisture content of less than 5.0% by weight; and
an inner cream textured component encapsulated within the outer component by the co-extrusion process which comprises a continuous stable emulsion of water soluble additives in an aqueous phase comprising a high solids contents sugar syrup and hydrocarbon soluble additives in a lipid free hydrocarbon phase comprising paraffin which inner cream textured component has a total moisture content between 8 and 16% by weight.

48. An animal food product as claimed in claim 47 wherein the sugar syrup comprises sugar and water in the ratio of between 60:40 and 90:10.

49. An animal food product as claimed in claim 47 wherein the ratio of sugar to water of the order of 80:20.

50. An animal food product as claimed in claim 47 wherein the sugar syrup content of the inner component is between 25 to 55% by weight of the inner component.

51. An animal food product as claimed in claim 47 wherein the sugar syrup content of the inner component is of the order of 40% by weight of the inner component.

52. An animal food product as claimed in claim 47 wherein the hydrocarbon phase is between 25 and 55% by weight of the inner component.

53. An animal food product as claimed in claim 47 wherein the hydrocarbon phase is of the order of 40% of the total weight of the inner component.

54. An animal food product as claimed in claim 47 in which the water soluble additives comprise one or more of:
calcium carbonate,
dipotassium phosphate,
manganous sulphate monohydrate,
zinc chelate,
Inositol,
folic acid,
taurine,
pantothenic acid,
potassium sorbate,
tricalcium phosphate,
ferrous sulphate heptahydrate,
copper chelate,
Niacin,
herbal extracts,
plant-based extracts,
caramel, and
sodium benzoate.

55. An animal food product as claimed in claim 47 in which the hydrocarbon soluble additives comprise one or more of:
vitamin A palmitate,
vitamin oil D,
di-α-tocopheryl acetate,
flavourings,
glycerol,
acacia gum.

56. An animal food product as claimed in claim 47 in which the outer component additionally comprises one or more of the following:
mineral supplements
herbal extracts, and
plant-based extracts.

57. An animal food product as claimed in claim 47 in which the inner cream-textured component includes particulate additives insoluble in water and hydrocarbons.

58. An animal food product as claimed in claim 47 in which the particulate additives comprise an inner core encapsulated in a water and hydrocarbon insoluble outer shell.

59. A co-extruded dual component animal food product comprising:
an outer component which comprises a carbohydrate lipid and protein at least 60% by weight of which is provided by dry cereal, the outer component having a moisture content of less than 5.0% by weight; and
an inner cream textured component encapsulated within the outer component by the co-extrusion process which comprises a continuous stable emulsion of water soluble additives in an aqueous phase and hydrocarbon soluble additives in a lipid free hydrocarbon phase which inner cream textured component has a total moisture content between 8 and 16% by weight and a viscosity sufficient to prevent leaching of the inner component through the outer component.

60. An animal food product as claimed in claim 59, wherein the aqueous phase comprises a high solids content sugar syrup containing at least 60% by weight sugar.

61. An animal food product as claimed in claim 59, wherein the aqueous phase comprises a high solids content liquid sugar syrup with a sugar water ratio of the order of 80:20.

62. An animal food product as claimed in claim 59, wherein the aqueous phase comprises a high solids content sugar syrup containing at least 60% by weight sugar and in which the sugar syrup content of the inner component is between 25 to 55% by weight of the inner component.

63. An animal food product as claimed in claim 59, in which the hydrocarbon phase comprises liquid paraffin.

64. An animal food product as claimed in claim 59, wherein the hydrocarbon phase comprises liquid paraffin comprising between 25 and 55% by weight of the inner component.

65. An animal food product as claimed in claim 59, in which the hydrocarbon phase comprises liquid paraffin which is of the order of 40% of the total weight of the inner component.

66. An animal food product as claimed in claim 59 in which the water soluble additives comprise one or more of:
calcium carbonate,
dipotassium phosphate,
manganous sulphate monohydrate,
zinc chelate,
Inositol,
folic acid,
taurine,
pantothenic acid,
potassium sorbate,
tricalcium phosphate,
ferrous sulphate heptahydrate,
copper chelate,
Niacin,
herbal extracts,
plant-based extracts,
caramel, and
sodium benzoate.

67. An animal food product as claimed in claim 59 in which the hydrocarbon soluble additives comprise one or more of:
vitamin A palmitate,
vitamin oil D,
di-α-tocopheryl acetate,
flavourings,
trigarol,
glycerol,
acacia gum.

68. An animal food product as claimed in claim 1 in which the outer component additionally comprises one or more of the following:
mineral supplements
herbal extracts, and
plant-based extracts.

69. A method of producing a dual textured animal food product by co-extrusion comprising:
- preparing a dry mixture of carbohydrate protein and lipid including at least 60% by weight of dry cereal;
- ensuring the dry mixture has a moisture content of less than 5.0% by weight;
- preparing an aqueous phase solution of water and water soluble additives;
- preparing a hydrocarbon phase of a lipid-free liquid hydrocarbon and hydrocarbon soluble additives;
- combining the aqueous and hydrocarbon phases in proportions such as to achieve a total moisture content for the emulsion of between 8.% and 16% by weight;
- homogenising the aqueous and hydrocarbon phases to form a continuous stable emulsion, the homogenising comprising the steps of adding the hydrocarbon phase to the aqueous phase in discrete batches mixing them to form a continuous stable emulsion, the amount of each batch of the hydrocarbon phase not exceeding 10% by weight of the liquid to which it is added;
- co-extruding the dry mixture as an outer component with the continuous stable emulsion as an inner cream-textured component; and
- crimping and cutting the extrudate into discrete pillow shapes.

70. A method as claimed in claim 69 in which the additives are dissolved in the appropriate phase in discrete batches.

71. A method as claimed in claim 69 in which when the weight of additives to be added to a phase exceeds 10% by weight of the phase, the additive is dissolved in the phase in batches not exceeding 10% by weight of the phase to which it is being added.

72. A method as claimed in claim 69 comprising:
- mixing sugar and water in the ratio of at least 60:40 by weight to form a base aqueous phase and then adding additional water soluble additives to form the aqueous phase.

73. A method as claimed in claim 69 in which after the continuous stable emulsion is formed, further additives both water and hydrocarbon soluble dissolved in glycerol are added and homogenised with the stable emulsion.

74. A method as claimed in claim 69 wherein the aqueous phase comprises a high solids content sugar syrup containing at least 60% by weight sugar.

75. A method as claimed in claim 69, wherein the aqueous phase comprises a high solids content sugar syrup with a sugar water ratio of between 60:40 and 90:10.

76. A method as claimed in claim 69 wherein the aqueous phase comprises a high solids content sugar syrup in which the ratio of sugar to water is of the order of 80:20.

77. A method as claimed in claim 69, wherein the aqueous phase is a sugar syrup comprising between 25 to 55% by weight of the inner component.

78. A method as claimed in claim 69 wherein the aqueous phase is a sugar syrup of 40% by weight of the inner component.

79. A method as claimed in claim 69, wherein the hydrocarbon phase is liquid paraffin.

80. A method as claimed in claim 69, wherein the hydrocarbon phase is between 25 and 55% by weight of the inner component.

81. A method as claimed in claim 69, wherein the hydrocarbon phase is of the order of 40% of the total weight of the inner component.

82. A method as claimed in claim 69, in which the water soluble additives comprise on or more of:
- calcium carbonate,
- dipotassium phosphate,
- manganous sulphate monohydrate,
- zinc chelate,
- inositol,
- folic acid,
- taurine,
- pantothenic acid,
- potassium sorbate,
- tricalcium phosphate,
- ferrous sulphate heptahydrate,
- copper chelate,
- niacin,
- herbal extracts,
- plant-based extracts,
- caramel,
- sodium benzoate.

83. A method as claimed in claim 69, in which the hydrocarbon soluble additives comprise one or more:
- vitamin A palmitate,
- vitamin oil D,
- di-αtocopheryl actetate,
- flavourings,
- glycerol, and
- acacia gum.

84. A method as claimed in claim 69, in which the outer component additionally comprises one or more of the following:
- mineral supplements,
- herbal extracts,
- plant base extracts, and
- lecithin.

85. A method as claimed in claim 69, in which the inner cream textured component has added thereto particulate additives insoluble in water and hydrocarbons.

86. A method as claimed in claim 69, in which the particulate additives comprise an inner core encapsulated in a water and hydrocarbon insoluble outer shell.

87. A method of producing a dual textured animal food product by co-extrusion comprising:
- preparing a dry mixture of carbohydrate protein and lipid including at least 60% by weight of dry cereal;
- ensuring the dry mixture has a moisture content of less than 5.0% by weight;
- preparing an aqueous phase solution of water and water soluble additives and when the weight of additives to be added to a phase exceeds 10% by weight of the phase, the additive is dissolved in the phase in batches not exceeding 10% by weight of the phase;
- preparing a hydrocarbon phase of a lipid-free liquid hydrocarbon and hydrocarbon soluble additives and when the weight of additives to be added to a phase exceeds 10% by weight of the phase, the additive is dissolved in the phase in batches not exceeding 10% by weight of the phase;
- combining the aqueous and hydrocarbon phases in proportions such as to achieve a total moisture content for the emulsion of between 8.% and 16% by weight;
- homogenising the aqueous and hydrocarbon phases to form a continuous stable emulsion, the homogenising comprising the steps of adding the hydrocarbon phase to the aqueous phase in discrete batches mixing them to form a continuous stable emulsion, the amount of each batch of the hydrocarbon phase not exceeding 10% by weight of the liquid to which it is added;

co-extruding the dry mixture as an outer component with the continuous stable emulsion as an inner cream-textured component; and crimping and cutting the extrudate into discrete pillow shapes.

88. A method as claimed in claim 87 comprising:

mixing sugar and water in the ratio of at least 60:40 by weight to form a base aqueous phase and then adding additional water soluble additives to form the aqueous phase.

89. A method as claimed in claim 87 in which after the continuous stable emulsion is formed, further additives both water and hydrocarbon soluble dissolved in glycerol are added and homogenised with the stable emulsion.

90. A method as claimed in claim 87 wherein the aqueous phase comprises a high solids content sugar syrup containing at least 60% by weight sugar.

91. A method as claimed in claim 87, wherein the hydrocarbon phase is liquid paraffin.

92. A method as claimed in claim 87, wherein the hydrocarbon phase is liquid paraffin comprising of the order of 40% of the total weight of the inner component.

* * * * *